United States Patent Office 3,424,590
Patented Jan. 28, 1969

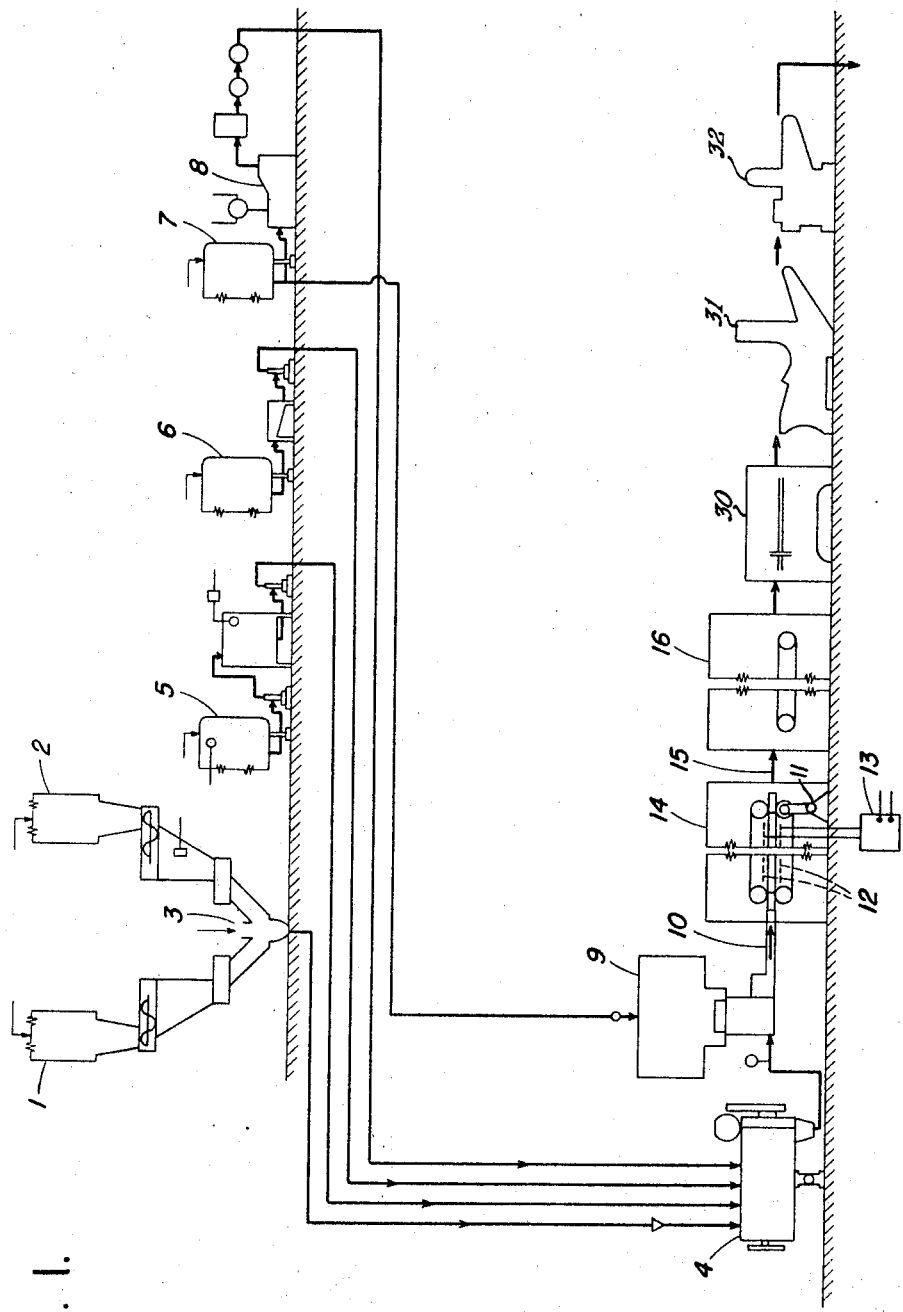
Fig. I.

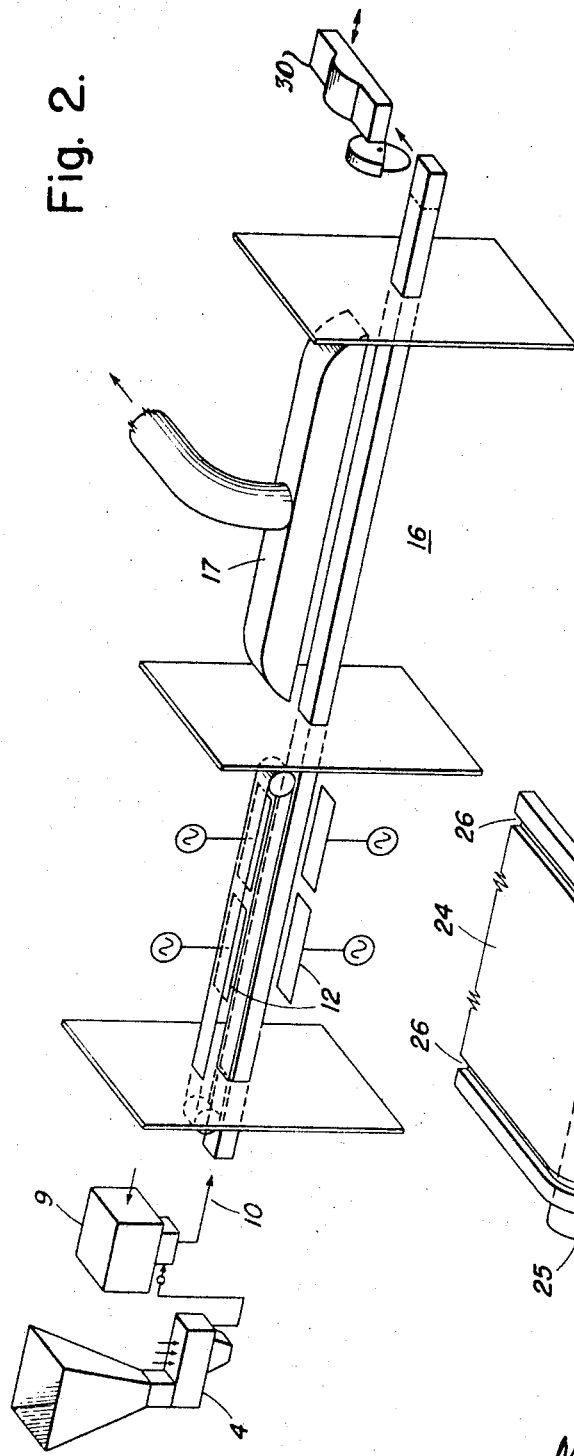
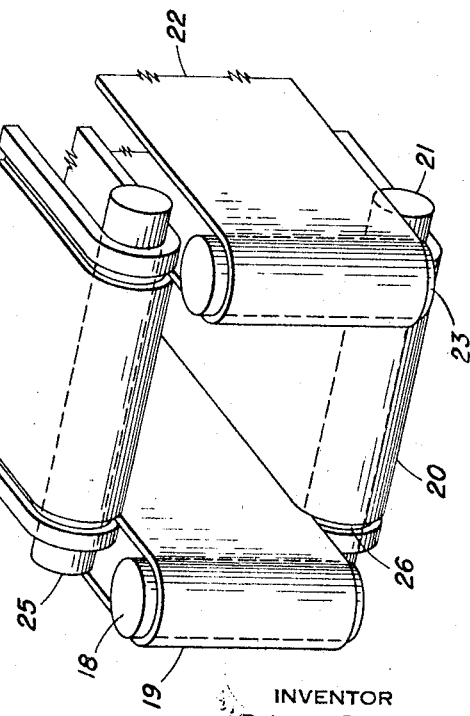

3,424,590
BREADMAKING PROCESS
Peter J. Booras, 19 Gurnsey St., Keene, N.H. 03431
Continuation-in-part of application Ser. No. 405,324,
Sept. 24, 1964. This application Feb. 28, 1966, Ser.
No. 530,694
U.S. Cl. 99—90       14 Claims
Int. Cl. A21c 3/00

ABSTRACT OF THE DISCLOSURE

A method for the continuous manufacture of bread, wherein the leavened dough product is continuously produced as an endless leavened dough bar within a continuous confining arrangement surrounding a substantial portion of the periphery of the dough bar and heat capable of quickly baking the dough is supplied while advancing and shaping the dough bar within the confining arrangement so as to bake the dough as it is advanced and shaped.

The continuous confining arrangement is preferably in the form of a continuous, moving, multi-sided, non-collapsible, vapor porous, flexible, conveyor-shaper which advances the dough bar with a pulling action and permits the dough to be shaped, and the rate of rise of the dough to be controlled, by a predetermined, varying pressure applied thereto.

Also, preferably, the heat is supplied by applying a heat dissipative conductance to the confining arrangement and producing a dielectric field transversely thereof, the dielectric field energizing the heat dissipative conductance so as to emit radiant heat, whereby the dough is baked by the dielectric field and browned by the radiant heat emitted from the heat dissipative conductance.

---

This application is a continuation-in-part of application Ser. No. 405,324, filed Sept. 24, 1964, now abandoned said application Ser. No. 405,324 being a divisional of application Ser. No. 112,747 now Patent No. 3,256,838 being a continuation-in-part of Ser. No. 736,786, filed May 21, 1958, now abandoned.

The present invention relates to improvements in continuous automatic bread-manufacturing processes.

In prior art processes, it is conventional to use an individual pan for each loaf of bread. Even in cases where a continuous bar of bread dough is taught as desirable, individual pans are suggested for containing the dough during the proofing stage and during the development of said dough due to leavening action. Prior art methods usually consist of a series of distinct and discontinuous stages or steps. Intermediate these stages there often exists environmental change, particularly with respect to humidity, temperature and the like which tend to affect the uniformity of texture and consistency in the finished product.

It is therefore an object of this invention to provide a new and improved method of making bread.

Another object of this invention is to provide a new and improved practical method of manufacturing bread without the formation of end crusts.

Another object of this invention is to provide a new and improved method of making bread which eliminates the use of individual loaf pans.

Another object of this invention is to provide a new and improved method of making bread which is "straight-line" in nature, with a minimum of handling of the leavened dough so as to minimize disturbance and rupturing of the cell structure.

Another object of this invention is the production of bread slices which are individually and collectively of uniform texture and consistency.

Another object of this invention is to provide a novel method in the manufacture of bread which will produce a bread product of uniform texture and consistency with less dependence on the character and quality of the bread-making ingredients.

Another object of this invention is the elimination of the proofing step required by the use of yeast as a leavening agent.

Another object of this invention is to provide heating means which includes dielectric heating and which will not only bake the bread, but also may indirectly cause the bread to be browned.

Another object of this invention is to provide a novel method of manufacturing bread wherein the baking is begun immediately upon formation of the leavened dough product.

Another object of this invention is to provide a novel method of making bread wherein the rate of rise of the dough may be variably controlled.

Another object of this invention is to provide a novel method of making bread wherein the leavened dough product is advanced by a pulling action and shaped by a controlled, predetermined, varying pressure.

Another object of this invention is to provide a novel method of making bread wherein heat is supplied to the leavened dough product as it is advanced and shaped so as to bake and brown the dough as it is advanced and shaped.

Another object of this invention is to provide a novel method of making bread wherein the bread dough is prepared, leavened and baked within a substantially totally enclosed system.

Another object of this invention is to provide a novel method of baking bread wherein the environmental pressures, humidity, and temperature are controlled during the baking and browning operation so as to produce a bread product of uniform texture and consistency from day to day without regard to varying climatic conditions.

Objects and advantages of the invention will be set forth in part hereinafter and in part will be obvious herefrom, or may be learned by practice with the invention, the same being realized and attained by means of the parts, steps, processes, and combinations pointed out in the appended claims.

The invention consists in the novel parts, steps, processes, arrangements, combinations and improvements herein shown and described.

The present invention in a method for manufacturing bread is characterized by a single, "straight-line," continuous operation which efficiently and uniformly bakes and browns a continuous bar of bread dough into the final bread product in a matter of minutes. The completes baking and browning operation is wholly automatic and can take place in a totally enclosed system: it eliminates the time-consuming conventional bread-making techniques of kneading, fermentation and proofing, and eliminates all handling of pans, etc., required when baking in the conventional manner of distinct and discontinuous stages.

Briefly described, the method of the present invention for the continuous manufacture of bread comprises the steps of: preparing the dough; adding a fast rise leavening agent to the dough; forming the dough as an endless leavened dough bar within a continuous confining arrangement surrounding a substantial portion of the periphery of the dough bar and supplying heat thereto; advancing and shaping the dough bar within the confining arrangement while the heat is being supplied thereto so as to bake and brown the dough as it is advanced and shaped; and removing heat from the baked and browned dough bar. The continuous confining arrangement is preferably in the form of a continuous, moving, multi-sided, non-collapsible, vapor porous, flexible, conveyor-shaper which advances the dough bar with a pulling action and permits the dough to be shaped, and the rate of rise of the dough to be controlled, by a predetermined, varying pressure applied thereto.

In a preferred embodiment, the leavened dough bar is formed by extrusion and the leavening occurs as the dough is released from the extruder and fed into the continuous confining arrangement. Also, in a preferred embodiment, the heat is supplied by applying a heat dissipative conductance to the confining arrangement and producing a dielectric field transversely thereof, the dielectric field energizing the heat dissipative conductance so as to emit radiant heat, whereby the dough is baked by the dielectric field and browned by the radiant heat emitted from the heat dissipative conductance.

As previously indicated, one of the advantages of the present invention is the elimination of the need for pans through the use of a multi-sided conveyor-shaper means which acts both to advance the dough through the baking zone by a pulling action and also acts as a continuous confining means for shaping the dough with a predetermined varying pressure.

The present invention further eliminates the lack of continuity in the prior art by eliminating the use of separate pans and by providing a uniform bar of dough for baking by means of preferably extruding the dough from a master batch, and by assuring uniform rising of the dough by the use of metered amounts of leavening agents capable of producing a fast rise in the dough. Typical of the leavening agents which may be employed is carbon dioxide, which is preferred. Other suitable leavening agents will be well understood in the art. In this connection it should be pointed out that the leavening agent, per se, forms no part of the present invention, and any suitable material may be used, so long as it performs the function of quickly raising the dough.

When carbon dioxide is used as the leavening agent, it is supplied in an aqueous solution to the dry ingredients which go to make up the dough. In order to insure uniformity of rising, amounts of carbon dioxide may be supplied to the wet dough prior to extrusion to give primary rising of the dough. Alternatively all the $CO_2$ necessary for leavening could be supplied directly to the dough as a gas and the water solution of $CO_2$ omitted. An important advantage in using carbon dioxide as the leavening agent is the elimination of the usual proofing period involved when yeast is used. This results in the elimination of some seven hours which is taken up when conventional proofing or development of the dough by yeast is employed. The greater control of the amount of leavening agent possible when carbon dioxide is used results in a more uniform product, as well as greater ability to vary the fineness or consistency of the loaf.

It will be understood that the foregoing general description and the following detailed description as well are exemplary and explanatory of the invention but are not restrictive thereof.

The accompanying drawings, referred to herein and constituting a part hereof, illustrate one embodiment of the invention, and together with the description, serve to explain the principles of the invention.

FIGURE 1 is a flow diagram of the bread manufacturing process of my invention;

FIGURE 2 is an isometric expansion of the mixing, baking and cooling zones; and

FIGURE 3 is a fragmentary perspective of the oven conveyor-shaper confining arrangement.

According to the present invention the dry ingredients of the dough are conveyed from conventional storage means 1, 2, 3 to a mixer 4 in the proper proportions, and have added to them shortening from a storage vessel 5 which can be conventionally supplied with a heating means to insure flowability and sugar solution from vessel 6. The piping leading from the shortening storage vessel to the dough mixer 4 may be heated as well.

Carbon dioxide which is stored under pressure in vessel 7 is used to treat water in carbonator 8, which treated water is used to adjust the liquid content of the dough and supply it with a leavening agent in the form of the carbon dioxide dissolved in the water. The ingredients are mixed until homogeneous. The fluid mixture is then pumped to the developer where the gluten further develops to give the dough good cohesion and gas-retaining properties. Carbon dioxide gas may be added directly to the dough in developer 9 from carbon dioxide storage vessel 7, in the event insufficient gas was added with the water used to adjust the liquid content of the dough in the mixer 4, so that it will contain 800–3000 cubic centimeters, preferably 1100–1500 cubic centimeters, of carbon dioxide at standard temperature and pressure per each 18 ounces of dough prior to extrusion depending upon the degree of lightness desired. Developer 9 contains mixing means which in conjunction with the carbon dioxide's pressure further incorporate this leavening agent into the dough. The details of the apparatus from which the dough ingredients are dispensed, mixed, carbonated and developed are of well known construction, and accordingly are not shown in the drawings.

The dough when properly developed is preferably extruded as a continuous leavened plastic mass, the leavening occurring as the pressure which is exerted on the dough in the developer 9 is released when the dough is extruded from the mouth of extruder 10. In this connection, it will be understood to those of ordinary skill in the art, that the dough may be released from the developer 9 by suitable means other than extrusion.

In a preferred method of operation, the dough is mixed in developer 9 under a predetermined pressure and thereafter extruded, or otherwise suitably transferred, as a leavened dough mass to a continuous confining arrangement, the confining arrangement also being located in a closed atmosphere, the pressure of which can be variably controlled either at a single predetermined pressure or on a graduated pressure scale along the length of the confining arrangement. The humidity and temperature of the closed atmosphere may likewise be controlled as desired, as more fully explained hereinbelow.

For example, it has been found that the pressure within the developer 9 may suitably range from approximately 20 lbs. gauge pressure to more than 100 lbs. gauge pressure, the particular pressure selected depending upon the desired formulation and consistency in the final bread product, when the pressure about the confining arrangement is maintained at atmosphere (zero lbs. gauge pressure). For a dough of average consistency and texture, it is preferred to mix the dough at a pressure of about 60–80 lbs. gauge, and maintain the pressure surrounding the confining arrangement, to which the dough is fed from the developer, at atmosphere. By providing such a pressure differential between the developer and the confining arrangement, which can thus be as much as 100 lbs. gauge, or more, it is possible to obtain a substantially instantaneous leavening of the dough upon release from the developer, on the order of a few seconds to less than a second.

Alternatively, the pressure surrounding the gas or vapor porous confining arrangement may be controlled so as to have successive zones of lower pressure along the entire length of the confining arrangement or a portion thereof. Thus, the pressure surrounding the confining arrangement in the immediate vicinity of the discharge outlet in the developer would be only slightly less than the pressure within the developer and would then vary in increments of respectively successively lower pressures at successive zones along the length of the confining arrangement until atmosphere conditions are reached.

By providing such a graduated pressure differential between the developer and the confining arrangement, it is possible to use sufficient gas, which may be the leavening agent, within the developer to insure a fully leavened dough yet minimize the rupture of the cell walls as the dough leaves the developer by gently and gradually bringing the dough to its fully leavened size. Thus, the vesicular structure of the dough, necessary for good consistency and texture in the final bread product, is not destroyed.

It will be understood from the foregoing description that the important feature of the invention is not in the particular pressures involved, but is the feature of transferring the dough from a developer to a continuous confining arrangement which is maintained at a controlled pressure less than that of the developer. Thus, the dough could be mixed at much higher pressures in the developer but released to a pressure greater than atmosphere, so that the pressure differential between the two would not be so great as to violently rupture the cell walls of the dough. Likewise, where a graduated pressure differential is used, the lowest pressure may be greater than atmospheric. An added advantage of this latter alternative is that the cooling zone may then be at atmospheric pressure, since the vapor pressure of the bread would continue to be higher than the pressure in the cooling zone, enabling the bread to cool rapidly. On the other hand, of course, the dough could be mixed at low pressures and released into a vacuous atmosphere.

It will further be understood that, by utilizing a synthetic, fast rise leavening agent and providing a moving, continuous confining arrangement for pulling the leavened dough away from the developer, so as to quickly bake and brown the dough bar, the confining arrangement may be short enough to be practically located in a substantially totally enclosed system, whereby the environmental humidity and temperature may also be controlled at constant conditions.

In accordance with the invention, the bar of leavened dough upon being extruded is taken up by a continuous confining arrangement. As here preferably embodied, this arrangement comprises a vapor or gas porous, tubular conveyor consisting of four endless belts running in the same direction internally with respect to the major axis of the tube they form and lapped in such a manner as to provide a continuous confining surface for the continuous bar of bread having a generally rectangular cross section. Details of the conveyor are shown in FIGURES 1, 2 and 3.

FIGURES 1 and 2 show schematically that heating means 12 may be positioned within the folds of each of the individual belts making up the conveyor. Any suitable heating means may be used which is capable of quickly baking the dough, such as heating means utilizing a high frequency, alternating electric field. Particularly useful are dielectric plates capable of producing a dielectric field, through which the continuous rod of leavened dough passes. When dielectric plates are employed, care must be taken to space the plates so as to prevent arcing. As shown in FIGURE 1, the dielectric heating means 12 may comprise plates connected to a high frequency generator 13 which produces a frequency of from 2 to 60 megacycles and which will preferably be operated at 15 megacycles to cause baking of the dough to form bread. Dielectric heating means are especially advantageous in that they may be used in conjunction with and form a part of belting of a proper character, for instance flexible woven glass fabric, reinforced fluorinated hydrocarbon polymers or reinforced silicone rubbers coated or impregnated with about 5–30% of a finely divided heat dissipative conductance.

The composite belt may be made porous by any conventional technique, which will be understood to those of ordinary skill in the art. For example, it has long been conventional and well known in the manufacture of window screens to precoat the strands of wire, glass, etc., with a plastic material before weaving the strands into the screen mesh. This same conventional technique could be used in the present invention. Thus, for example, where the composite belt is formed of glass fabric having a suitable heat dissipative conductance, the porosity may be maintained by coating or impregnating the glass threads prior to weaving and thereafter loosely weaving the threads in forming the belt. The heat dissipative conductance may be applied to the glass fabric by coating or impregnating the fabric with a suitable fluorinated hydrocarbon polymer containing the heat dissipative conductance, for example, tetrafluoroethylene polymer containing carbon black. Alternatively, the composite belt could be made solely from tetrafluoroethylene polymer containing carbon black. Metallic copper can be used in place of carbon black as a heat dissipative conductance.

The composite belting may be caused to heat up by the dielectric field produced by the dielectric plates, emitting radiant thermal energy to thereby cause the browning or crusting of the bread. Dielectric heating alone would not cause browning, but the cooperation between the dielectric heating means and the conveyor belting capable of being energized to give off radiant heat does, thus eliminating the need for auxiliary browning means.

The considerations involved in the determination of each variable of the novel baking and browning means, though familiar to those skilled in the art, are quite complex so that they are best mentioned as guides to those less skilled in this field. The dough in offering resistance to the passage of the dielectric field will be baked at a field strength of from 2 to 60 megacycles. This results in the baking of the dough but does not produce the radiant thermal energy necessary to produce the browning or crusting of bread. Means must be introduced to convert a portion of the dielectric energy to radiant energy by the interposing in the dielectric field of a material having a suitable dissipation factor. The amount of such material being governed by the browning temperature which is normally between 350 and 425° F., unless singeing is desired at higher temperatures, its dissipation factor, the amount used, the strength of the field of activating energy and the time of exposure of the dough to the radiant energy.

FIGURE 3 shows the arrangement of belts and axles needed to make up a satisfactory tubular conveyor. Lower horizontal belt 20 passes around axle 21, upper horizontal belt 24 passes over axle 25; vertical belts 19 and 22 abut horizontal belts 20 and 24, the edges of which former belts are lapped into grooves 26 on the surfaces of belt 20, which passes over axle 21 and belt 24, which passes over axle 25. Each of the belts is endless, passing around corresponding axles at its other end in order to return. The inner face of each belt moves from the mouth of the extruder through the oven after which the baked loaf may be forwarded on a single-belt conveyor. The drive for the belts may be of any conventional design and is illustrated generally by reference numeral 11 in FIGURE 1.

Upon leaving baking oven 14, the hot bar of bread may be passed to a conventional single-belt conveyor 15, which takes it to a cooler chamber 16 in which is a mild vacuum of about 25 inches of mercury, or the equivalent pressure differential from oven 14, which results in the removal of moist hot vapors from the newly baked bread through exhaust duct 17 and brings about a rapid lowering in temperature. The cooled bread is now cut into loaves by a reciprocable rotary cutter 30; sliced by a conventional slicing machine 31; and wrapped in loaf size packages by a wrapping machine 32 in the conventional manner.

It will thus be seen that the objects of the invention are realized by the method described herein.

The method shortens all phases of the normal breadmaking cycle, so that a practical, continuous operation is achieved. Thus, by forming the leavened dough bar without a continuous confining arrangement and beginning to bake the bread substantially immediately upon formation of the leavened dough, in addition to eliminating handling problems, wasteful end crusts, and making the operation continuous, the consistency and texture of the final bread product is enhanced. By simultaneously advancing and shaping the dough bar as it is baked and browned by the heat applied thereto, a single, "straight-line," economically practical continuous bread-making operation is achieved which can be accomplished in a matter of a few minutes as opposed to the several hours required with conventional techniques. By shaping the dough with a predetermined, varying pressure as it is baked and browned, additional control is obtained over the rising of the bread dough and, consequently, the consistency and uniformity of the final bread product is more closely controlled. The preferred method of advancing the dough bar by a pulling action contributes to the speed of the operation by quickly removing the leavened dough from the area of preparation.

The invention in its broader aspects is not limited to the specific steps, methods and compositions described, but departure may be made therefrom within the scope of the accompanying claims without departing from the principles of the invention and without sacraficing its chief advantages.

What is claimed is:

1. In the continuous manufacture of bread, a method for continuously producing a leavened dough product in the form of an endless dough bar comprising the steps of: continuously introducing the desired dough ingredients in the desired proportions to mixing means; continuously introducing a predetermined amount of a leavening agent in the form of a gaseous medium under a predetermined pressure to said mixing means; working said dough mixture in said mixing means sufficiently to develop cohesion and gas-retaining properties in the dough and to incorporate the gaseous medium therein; and continuously and simultaneously releasing the developed dough from said mixing means and the pressure exerted on the dough in said mixing means so as to produce an endless leavened dough bar, the leavening of the dough occurring immediately upon the release of said pressure.

2. A method for the continuous manufacture of bread, comprising the steps of: preparing a dough; adding a fast rise leavening agent to said dough; continuously forming said dough as an endless leavened dough bar within a continuous confining arrangement surrounding a substantial portion of the periphery of said dough bar; producing a high frequency, alternating electric field transversely of said confining arrangement so as to supply heat thereto substantially simultaneously with the formation of said leavened dough bar; advancing said dough bar within said confining arrangement by a pulling action and simultaneously shaping said dough bar within said confining arrangement as it is advanced thereby, whereby said dough is baked as it is advanced and shaped.

3. A method as claimed in claim 2 wherein said leavened dough bar is formed by extrusion and wherein the leavening occurs as the dough is released from the extruder and is removed by said continuous confining arrangement.

4. A method as claimed in claim 2 including applying a heat dissipative conductance to said confining arrangement responsive to said electric field so as to produce radiant heat energy, whereby said dough is baked by said electric field and browned by said radiant heat emitted from said heat dissipative conductance.

5. A method of claim 2 wherein the leavening agent is carbon dioxide, which is added in an amount of 800–3000 cubic centimeters at standard temperature and pressure for each 18 ounces of dough, and wherein heat is removed from the baked bar by means of a vacuum, the vacuum exerted being in the range of 15 to 28 inches of mercury.

6. The method as claimed in claim 2 including applying a controlled pressure to the surface of said dough bar so as to shape said dough bar.

7. The method as claimed in claim 6 including controlling the pressure surrounding the confining arrangement so as to apply a controlled pressure to the surface of the dough bar.

8. A method for the continuous manufacture of bread, comprising the steps of: preparing a dough; adding a fast rise leavening agent to said dough; extruding said dough as an endless leavened dough bar into a continuous, moving, flexible, non-collapsible, porous confining arrangement surrounding a substantial portion of the periphery of the dough bar, controlling the pressure about said confining arrangement less than that of the pressure within said developer so that a pressure differential exists between said developer and said confining arrangement, advancing and shaping said dough bar within said confining arrangement and simultaneously supplying heat thereto so as to bake the dough as it is advanced and shaped; and removing heat from the baked dough bar.

9. A method as claimed in claim 8 wherein said pressure differential is controlled so as to quickly form a fully leavened dough product while maintaining the vesicular structure thereof.

10. A method as claimed in claim 8, including applying a graduated pressure along the length of the confining arrangement so as to gently and gradually raise the bread dough to its fully leavened size.

11. A method as claimed in claim 8 including controlling the temperature and humidity about said confining arrangement.

12. A method as claimed in claim 9 wherein the fully leavened dough product is formed substantially instantaneously upon said dough leaving said extruder.

13. A method as claimed in claim 10, including cooling said baked dough bar at a pressure less than the lowest pressure surrounding said confining arrangement.

14. A method as claimed in claim 8, including producing a high frequency, alternating electric field transversely of said confining arrangement, and applying a heat dissipative conductance to said confining arrangement responsive to said electric field to produce radiant heat energy, whereby said dough is baked by said electric field and browned by said radiant heat emitted from said heat dissipative conductance.

References Cited

UNITED STATES PATENTS

| | | | |
|---|---|---|---|
| 2,953,460 | 9/1960 | Baker | 99—90 |
| 2,179,672 | 11/1939 | Roys | 107—54 |
| 2,255,282 | 9/1941 | Duffy et al. | 107—54 |
| 2,326,134 | 8/1943 | Freilich et al. | 99—90 |
| 2,413,003 | 12/1946 | Sherman | 99—90 X |
| 2,804,027 | 8/1957 | Hecht | 107—57 |

FOREIGN PATENTS

| | | |
|---|---|---|
| 59,279 | 11/1946 | Netherlands. |

OTHER REFERENCES

Pyler, "Baking Science and Technology," vol. II, 1952, Siebel Publishing Co., Chicago, pp. 469–470.

LIONEL M. SHAPIRO, *Primary Examiner.*